Figure 1:
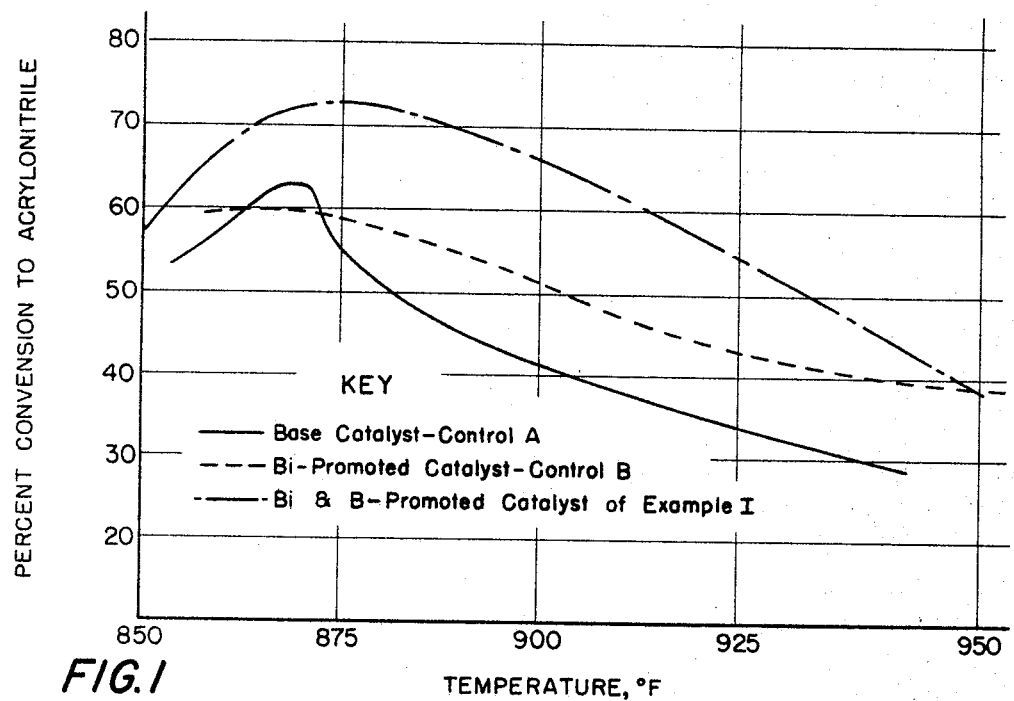

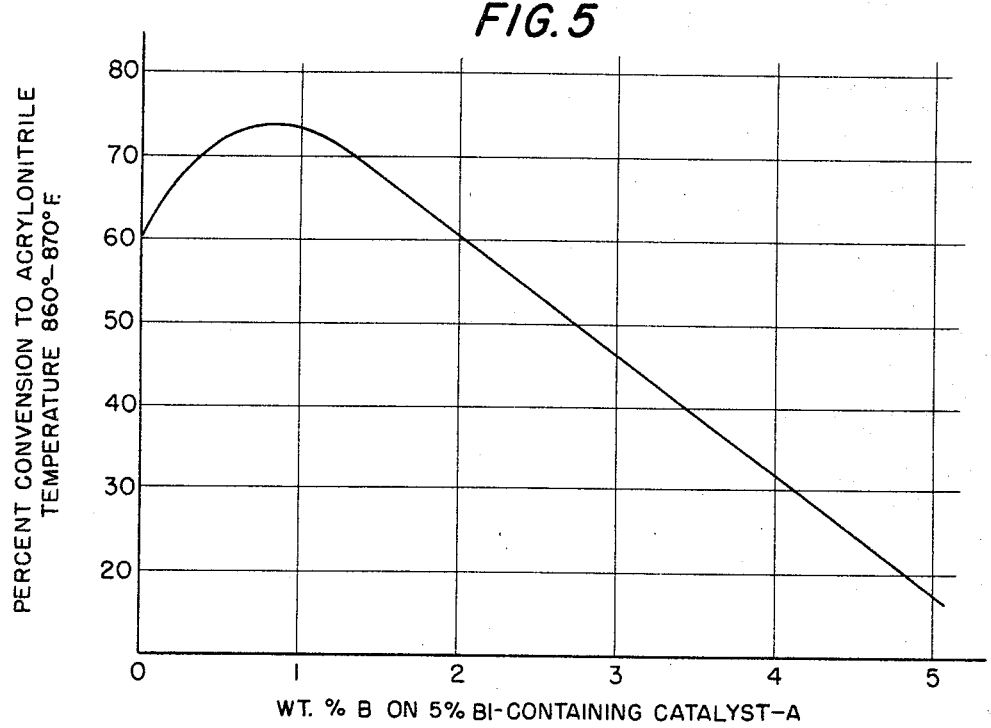

> United States Patent Office 3,354,197
Patented Nov. 21, 1967

3,354,197
PROCESS FOR THE MANUFACTURE OF UN-
SATURATED NITRILES FROM OLEFINS AND
AMMONIA
James Louis Callahan, Bedford, Berthold Gertisser, Cleveland Heights, and Joseph J. Szabo, Chagrin Falls, Ohio, assignors to The Standard Oil Company, Cleveland, Ohio, a corporation of Ohio
Original application Apr. 25, 1962, Ser. No. 190,038, now Patent No. 3,248,340, dated Apr. 26, 1966. Divided and this application Aug. 9, 1965, Ser. No. 510,414
6 Claims. (Cl. 260—465.3)

This is a division of application Ser. No. 190,038, filed April 25, 1962, now U.S. Patent 3,248,340.

This invention relates to the oxidation of olefin-ammonia mixtures to unsaturated nitriles, such as propylene-ammonia to acrylonitrile, using an improved oxidation catalyst consisting essentially of oxides of the elements bismuth and molybdenum, and optionally, phosphorus, promoted by oxides of boron and bismuth.

The Callahan, Foreman and Veatch U.S. Pat. No. 2,941,007 describes the oxidation of an olefin such as propylene and the various butenes with oxygen and a solid catalyst composed of the oxides of bismuth, molybdenum and silicon, and optionally, phosphorus. This catalyst selectively converts propylene to acrolein, isobutylene to methacrolein, α- and β-butylene to methyl vinyl ketone and to butadiene, etc. High yields are obtainable, although in the case of the butenes, careful control of reaction conditions may be required in order to direct the reaction in favor of either methyl vinyl ketone or butadiene, depending upon which of these alternative products is desired.

The Idol, Jr., Patent No. 2,904,580, employs the same catalyst to convert propylene, ammonia and oxygen to acrylonitrile, at approximately atmospheric pressures and elevated temperatures. Excellent conversions, usually in the range of 40 to 80%, nitrogen basis, of useful products are obtainable.

The catalyst

In accordance with the instant invention, the catalytic activity of such bismuth oxide-molybdenum oxide catalysts is greatly enhanced or promoted by the combination therewith of a mixture of boron and additional bismuth in the form of their oxides, referred to hereinafter as promoters. The promoters in accordance with the invention are best applied by impregnation or surface coating of the catalyst, after its formation in accordance with the procedure described in Ser. No. 851,919, the disclosure of which is hereby incorporated by reference. Further, in accordance with the invention, it has been determined that a portion of the supplemental bismuth oxide promoter can be replaced with manganese oxide, and that phosphorus oxide can also be present as a supplemental oxide.

The proportions of boron oxide and bismuth oxide, with or without phosphorus oxide and/or manganese oxide, are important in obtaining the optimum enhanced activity. The boron oxide concentration, calculated as boron, should be within the range from about 0.5 to about 1% by weight; and the amount of bismuth oxide, calculated as bismuth, should be within the range from about 5% to about 10% by weight, although more than 10% can be used, if desired. If manganese oxide is employed, it can be used on a bismuth oxide equivalent weight basis, but not more than about one third of the promoter bismuth oxide, calculated as bismuth, can be replaced by manganese oxide.

While the catalyst of this invention may be employed without any support, it is desirable to combine it with a support. A preferred support is silica because the silica improves the catalytic activity of the catalyst. The silica may be present in any amount but it is preferred that the catalyst contain between about 25 to 75% by weight of silica. Many other materials such as alundum, silicon carbide, alumina-silica, alumina, titania and other chemically inert materials may be employed as a support which will withstand the conditions of the process.

The catalyst may comprise phosphorus, also present in the form of the oxide. Phosphorus will affect, to some extent, the catalytic properties of the composition, but the presence or absence of phosphorus has no appreciable effect on the physical properties of the catalyst. Thus, the composition can include from 0%, and preferably from at least 0.1%, up to about 5% by weight of phosphorus oxide, calculated as phosphorus.

The promoter is incorporated with the catalyst base by impregnation thereof, using an aqueous solution, dispersion, or suspension of a boron compound and of a bismuth compound, with or without a manganese compound, either the oxide, or a compound thermally decomposable in situ to the corresponding boron oxide, bismuth oxide, and manganese oxide, respectively, without formation of other deleterious metal oxide residue, for instance, ammonium phosphate, ammonium tetraborate, ammonium permanganate, manganese nitrate, bismuth nitrate, boric acid, bismuth hydroxide, manganese hydroxide, bismuth phosphate, and bismuth borate. The phosphorus-containing compounds also add phosphorus to the catalyst. After impregnation with such solution, employed in a concentration and amount to provide the desired amount of bismuth and boron, and optionally, manganese, the catalyst base is dried, and then calcined at a temperature above that at which the compounds applied are decomposed to the oxides. Temperatures in excess of 800° F. but below that at which the catalyst is deleteriously affected, usually not in excess of about 1050° F., can be used.

The basic catalyst composition comprises bismuth oxide and molybdenum oxide, the bismuth-to-molybdenum ratio Bi:Mo being controlled so that it is at all times above 1:3. There is no critical upper limit on the amount of bismuth, but in view of the relatively high cost of bismuth and the lack of an improved catalytic effect when large amounts are used, generally the atomic ratio bismuth to molybdenum Bi:Mo of about 3:1 is not exceeded. The nature of the chemical compounds which compose the basic catalyst is not known. The catalyst may be a mere mixture of bismuth and molybdenum oxides, with or without phosphorus oxide, but it seems more likely that the catalyst is a homogeneous micro mixture of loose chemical combinations of oxides of bismuth and molybdenum, with, optionally, phosphorus, and it is these combinations which appear to impart the desirable catalytic properties to this catalytic composition. The catalyst can be referred to as bismuth molybdate, or, when phosphorus is present, as bismuth phosphomolybdate, but this term is not to be construed as meaning that the catalyst is composed of these compounds.

The bismuth and boron, and optionally, manganese, compounds added thereto as promoters may or may not enter into the chemical composition of the catalyst. Bismuth added later with boron produces a different result from boron added to a catalyst composition containing more than the usual amount of bismuth, i.e., that stoichiometrically equivalent to the weight of added boron, and has a different function, since the enhanced catalytic effect is not obtained when boron oxide is combined with a composition previously containing the same excess of bismuth. Hence, the promoted catalytic effect may be due to some complex boron oxide-bismuth oxide combination formed on the surface of the catalyst. In any event, the boron and bismuth are present in the form of their oxides, when combined therewith later in accordance with the invention.

The bismuth molybdate catalyst composition of the invention may have the following composition ranges, as long as the atomic ratio of bismuth to molybdenum is above 1:3:

| Element: | Weight, percent |
|---|---|
| Bismuth | 29.84–78.08 |
| Molybdenum | 11.32–47.29 |
| Oxygen | 9.96–26.84 |
| Phosphorus | 0–2.40 |

This same composition may be expressed in the form of the following empirical formula:

(1) $Bi_aP_bMo_{12}O_c$ where $a$ is 4 to 36, $b$ is 0 to 2, and $c$ is $$\tfrac{1}{2}\,n\cdot a + \tfrac{1}{2}\,n\cdot b + \tfrac{1}{2}\,p\cdot 12$$

and where $n$, $m$ and $p$ are the average valences of bismuth, phosphorus and molybdenum, respectively, in the oxidation states in which they exist in the catalyst as defined by the empirical formula above. Thus $n$ may range from 2 to 3, $m$ is about 5, and $p$ may range from 4 to 6, which collectively make $c$ range from 28 to 94.

When silica is used as the support, the empirical formula is (2) $Bi_aP_bMo_{12}O_c \cdot (SiO_2)_{1\ to\ 600}$ where $a$, $b$ and $c$ are as defined above.

When the silica is present as about 30 to 70 weight percent of the final composition, the empirical formula is (3) $Bi_aP_bMo_{12}O_c \cdot (SiO_2)_{30\ to\ 150}$ where $a$, $b$ and $c$ are as defined above.

To this are to be added bismuth oxide and boron oxides, as such or as formed in situ from other added bismuth and boron compounds, so that the empirical formula of the promoted catalyst in accordance with the invention corresponds to the following:

(4) 85–93% $(Bi_aP_bMo_{12}O_c \cdot (SiO_2)_{0-600}) \cdot$ 5.5–11.5% $Bi_2O_3 \cdot$ 1.5–3.5% $B_2O_3$ The values of $a$, $b$ and $c$ are in accordance with the definitions given above.

When the atomic ratio of bismuth to molybdenum Bi:Mo is about 3:4, the empirical formula is (5) 85–93% $(Bi_9P_bMo_{12}O_c \cdot (SiO_2)_{0-600}) \cdot$ 5.5–11.5% $Bi_2O_3 \cdot$ 1.5–3.5% $B_2O_3$ The values of $b$ and $c$ are as defined above.

When the silica is present as about 30 to 70 weight percent of the final composition, the empirical formula is (6) 85–93% $(Bi_aP_bMo_{12}O_c \cdot (SiO_2)_{30-150}) \cdot$ 5.5–11.5% $Bi_2O_3 \cdot$ 1.5–3.5% $B_2O_3$ where $a$, $b$ and $c$ are as defined above.

*Oxidation of olefins to nitriles—The reactants*

The reactants used are an olefin or mixture thereof, and oxygen, plus ammonia.

By the term "olefin," as used herein and in the appended claims, is meant the open-chain as well as cyclic olefins. Among the many olefinic compounds which may be utilized in accordance with the process of the invention, the following compounds are illustrative: propylene, butene-1, butene-2, isobutylene, pentene-1, pentene-2, 3-methyl-butene-1, 2-methyl-butene-2, hexene-1, hexene-2, 4-methyl pentene-1, 3,3-dimethyl-butene-1, 4-methyl-pentene-2, octene-1, cyclopentene, cyclohexene, 3-methylcyclohexene, etc.

This invention is directed particularly to the oxidation of the lower alkenes (3 to 8 carbon atoms) but higher alkenes may also be utilized with efficacy. These compounds and their various homologs and analogs may be substituted in the nucleus and/or in the substituents in various degrees by straight-chain alicyclic or heterocyclic radicals. The process of the invention is applicable to individual olefins as well as to mixtures of olefins and also to mixtures of olefins with the corresponding or other saturated organic compounds.

The process of this invention is particularly adapted to the conversion of propylene to acrylonitrile. In its preferred aspect the process comprises contacting a mixture comprising propylene, ammonia and oxygen with the catalyst at an elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give equivalent results. The molar ratio of oxygen to the olefin in the feed to the reaction vessel should be in the range of 0.5:1 to 3:1 and a ratio of about 1:1 to 2:1 is preferred.

The presence of the corresponding saturated hydrocarbons does not appear to influence the reaction to any appreciable degree, and these materials appear to act only as diluents. Consequently, the presence of the corresponding saturated hydrocarbons or other saturated hydrocarbons in the feed to the reaction is contemplated within the scope of this invention. Likewise, other diluents such as nitrogen and the oxides of carbon may be present in the reaction mixture without deleterious effect.

*Ammonia-olefin ratio*

The molar ratio of ammonia to olefin in the feed to the reaction may vary between about 0.05:1 to 5:1. There is no real upper limit for the ammonia-olefin ratio, but there is generally no point in exceeding the 5:1 ratio. At ammonia-olefin ratios appreciably less than the stoichiometric ratio of 1:1, various amounts of oxygenated derivatives of the olefin will be formed.

Significant amounts of unsaturated aldehyde or ketone as well as nitrile will be obtained at ammonia-olefin ratios substantially below 1:1, i.e., in the range of 0.15:1 to 0.75:1. Outside the upper limit of this range only insignificant amounts of aldehyde or ketone will be produced, and only very small amounts of nitrile will be produced at ammonia-olefin ratios below the lower limit of this range. It is fortuitous that within the ammonia-olefin range stated, maximum utilization of ammonia is obtained and this is highly desirable. It is generally possible to recycle the olefin to the process, whereas the unconverted ammonia may be recovered and recycled only with difficulty.

*$H_2O$-olefin ratio*

A particularly surprising aspect of this invention is the effect of water on the course of the reaction. We have found that the presence of water in the mixture fed to the reaction vessel improves the selectivity and yield of the reaction as far as the production of the nitrile is concerned. Improvements on the order of several hundred percent have been observed in the presence of water as compared to similar runs made in the absence of added water. Consequently, the presence of water has a marked beneficial effect on this reaction, but reactions not including water in the feed are not to be excluded from this invention.

In general, the molar ratio of water to olefin should be at least about 0.25:1. Ratios on the order of 1:1 are particularly desirable but higher ratios may be employed, i.e., up to about 10:1. Because of the recovery problems involved, it is generally preferred to use only so much water as is necessary to obtain the desired improvement in yield. It is to be understood that water does not behave as an inert diluent in the reaction mixture. This conclusion has been verified by employing other diluents in the reaction mixture, such as propane and nitrogen. No corresponding improvement in yield and selectivity is observed with such diluents. Although the exact manner in which the water affects the reaction is not understood, it is clear that the water does have a significant influence on the reaction.

One theory which has been postulated to explain the effect of water on the reaction involves the phenomena occurring at the surface of the catalyst. Water, because of its polarity, may assist in the desorption of the reaction products from the surface of the catalyst. According to another hypothesis, the water may change the nature of the catalyst at the catalyst surface by affecting the acidity of the catalyst. Notwithstanding the fact that either of these theories may be in error, the improved results occasioned by the use of water are evident and the theory by which these results are to be explained is therefore to be considered immaterial.

Process conditions

The temperature at which the reaction is carried out may be any temperature in the range of from about 550 to about 1000° F. The preferred temperature range runs from about 800 to 950° F.

The pressure at which the reaction is conducted is also an important variable, and the reaction should be carried out at about atmospheric or slightly above atmospheric (2 to 3 atmospheres) pressure. In general, high pressures, i.e., above 250 p.s.i.g., are not suitable for the process since higher pressures tend to favor the formation of undesirable by-products.

The apparent contact time employed in the process is not especially critical, and contact times in the range of from 0.1 to about 50 seconds may be employed. The apparent contact time may be defined as the length of time in seconds which a unit volume of gas measured under the conditions of reaction is in contact with the apparent unit volume of the catalyst. It may be calculated, for example, from the apparent volume of the catalyst bed, the average temperature of the reactor, and the flow rates in the vessel of the components of the reaction mixture. The optimum contact time will, of course, vary depending upon the olefin being treated, but in general it may be said that a contact time of from 1 to 15 seconds is preferred.

In general, any apparatus of the type suitable for carrying out oxidation reactions in the vapor phase may be employed in the execution of this process. The process may be conducted either continuously or intermittently. The catalyst bed may be a fixed bed employing a pelleted catalyst or, in the alternative, a so-called "fluidized" bed of catalyst may be employed. The fluidized bed offers definite advantages with regard to process control in that such a bed permits closer control of the temperature of the reaction as is well known to those skilled in the art.

The reactor may be brought to the reaction temperature before or after the introduction of the reaction feed mixture. However, on a large scale operation it is preferred to carry out the process in a continuous manner, and in such a system the recirculation of the unreacted olefin is contemplated. Periodic regeneration or reactivation of the catalyst is also contemplated, and this may be accomplished, for example, by contacting the catalyst with air at an elevated temperature.

The products of the reaction may be recovered by any of the methods known to those skilled in the art. One such method involves scrubbing the effluent gases from the reactor with cold water or an appropriate solvent to remove the products of the reaction. In such a case, the ultimate recovery of the products may be accomplished by conventional means. The efficiency of the scrubbing operation may be improved when water is employed as the scrubbing agent by adding a suitable wetting agent to the water. Where molecular oxygen is employed as the oxidizing agent in this process, the resulting product mixture remaining after the removal of the nitriles may be treated to remove carbon dioxide with the remainder of the mixture containing the unreacted propylene and oxygen being recycled through the reactor. In the case where air is employed as the oxidizing agent in lieu of molecular oxygen, the residual product after separation of the nitriles and other carbonyl products may be scrubbed with a nonpolar solvent, e.g., a hydrocarbon fraction, in order to recover unreacted propylene and in this case the remaining gases may be discarded. The addition of a suitable inhibitor to prevent polymerization of the unsaturated products during the recovery steps is also contemplated.

The following examples, in the opinion of the inventors, represent preferred embodiments of their invention:

Example 1

A bismuth silicophosphomolybdate catalyst base was prepared by the following procedure:

74 g. of an 85% phosphoric acid was added to 8330 g. of an aqueous silica sol containing 30% silica. Next, 2800 g. of bismuth nitrate was dissolved in a solution made by diluting 160 ml. of 70% nitric acid to 1540 ml. with distilled water. The bismuth nitrate solution was then added to the silica sol. Next, 1360 g. of ammonium molybdate was dissolved in 1540 ml. of distilled water, and this solution added to the silica sol. The resulting catalyst slurry was dried in an oven at 200° F. for 24 hours and then calcined in a furnace at 800° F. for 24 hours. After cooling, the catalyst was ground into particles, and screened through a 10 mesh screen. A portion of the 8–10 mesh material was then made into tablets, while the remainder was retained for use as a control, designated hereinafter as Control A.

The final catalyst composition corresponded to the empirical formula $Bi_9PMo_{12}O_{52} \cdot (SiO_2)_{65}$, having the following composition:

| Element: | Weight, percent |
|---|---|
| Bismuth | 24.2 |
| Phosphorus | 0.4 |
| Molybdenum | 14.8 |
| Silicon | 23.4 |
| Oxygen | 37.2 |

This tabletted catalyst was then impregnated with promoters in accordance with the invention, by the following procedure:

81.8 g. of boric acid was dissolved in hot water and diluted up to 420 ml. This hot solution was used to impregnate 400 g. of the tabletted catalyst prepared as described above, dipping tablets of the catalyst contained in a wire basket in the boric acid solution for 4 minutes, then removing and draining them for 4 minutes. By this procedure, 120 ml. of the boric acid solution was absorbed by the catalyst, equivalent to 23 g. $H_3BO_3$. The wet catalyst was dried overnight, and a portion was set aside, for use later as Control C.

The remainder of the boric-acid impregnated catalyst was mixed well with a solution prepared by dissolving 47 g. of bismuth nitrate $Bi(NO_3)_3 \cdot 5H_2O$ in 40 cc. of concentrated nitric acid, specific gravity 1.42, diluting to 120 cc. with water. Another portion of the base catalyst (Control A), not previously impregnated with boric acid solution, was then impregnated with bismuth nitrate solution in the same way. This was marked Control B. Again, the catalyst was dried at 120° C. overnight.

Controls B and C and the twice impregnated catalyst of the invention then were calcined in air for 14 to 16 hours at 800° F. Finally, the three calcined catalysts were ground and screened, to obtain a size fraction in the 8 to 10 mesh range.

Thus, Control B contained 5% added bismuth, Control C 1% boron, Control A neither, and the catalyst of the invention, 5% added bismuth and 1% added boron together.

The promoted catalyst and the control catalysts A, B, and C without promoters and with only one promoter were employed in a series of experiments, to determine catalytic effectiveness, using a fixed bed reactor, in the oxidative conversion of propylene and ammonia to acrylonitrile. A 90 ml. catalyst charge was used in each run. Gases were metered by rotameter, and water was fed by a Sigma motor pump. The feed ratios were held constant at $H_2C=CH-CH_2/NH_3/Air/N_2/H_2O$ 1/1.5/12/4/0.8, and the contact time was held constant at 5 seconds. The reaction temperature was varied from 860 to 950° F. in the series of runs carried out. The percent conversion to acrylonitrile versus reaction temperature for each catalyst is shown in FIGURE 1. At the optimum temperature range of 865 to 875° F. 92.6% of the propylene feed was converted, 73.2% being converted to acrylonitrile, 8.4% to acetonitrile, and the remainder to a mixture of carbon dioxide and hydrogen cyanide. The useful yield was 89.6%.

In contrast, Control A, the base catalyst without promoters, at the optimum temperature of 860–870° F., gave a total conversion of 93.2%, of which 63.4% was acrylonitrile, 13% acetonitrile and the remainder, carbon dioxide and hydrogen cyanide. The useful yield was 78.6%. The Bi-promoted Control B at the optimum temperature of 860° F. gave a total conversion of 85.6%, of which 58.7% was acrylonitrile, 9.1% acetonitrile, and the remainder carbon dioxide and hydrogen cyanide. The useful yield was 70.9%. The Bi-promoted Control C at the optimum temperature of 880° F. gave a 44.1% total conversion, of which 37.4% was acrylonitrile, 3% acetonitrile, 1.7% acrolein, and the remainder, carbon dioxide and hydrogen cyanide.

Thus, boron alone acts as a poison, not as a promoter, bismuth alone also has a definite depressing effect on maximum yield, while the two together materially enhance the catalytic effect, as compared to the base catalyst.

The bismuth and boron promoted catalyst was employed in fluidized form for the conversion of propylene and ammonia to acrylonitrile. The base catalyst was used as Control A. Contact time in all runs was 7.6 seconds, and the pressure was atmospheric. The other process conditions and the data obtained appear in Table I below.

Example II

The bismuth silicophosphomolybdate catalyst of Example I was employed to prepare another series of promoted catalysts corresponding to those of Example I but with a lesser amount of boron. Control A, as before, was the base catalyst. Control C was prepared in the same way, but using a boric acid solution containing only 40.9 g. of boric acid, half the previous concentration, thus giving a catalyst containing only 0.5% added boron, instead of 1%. Control B was identical to Example I, and the catalyst of the invention contained 0.5% added boron and 5% added bismuth, as the oxides.

Figure 2:
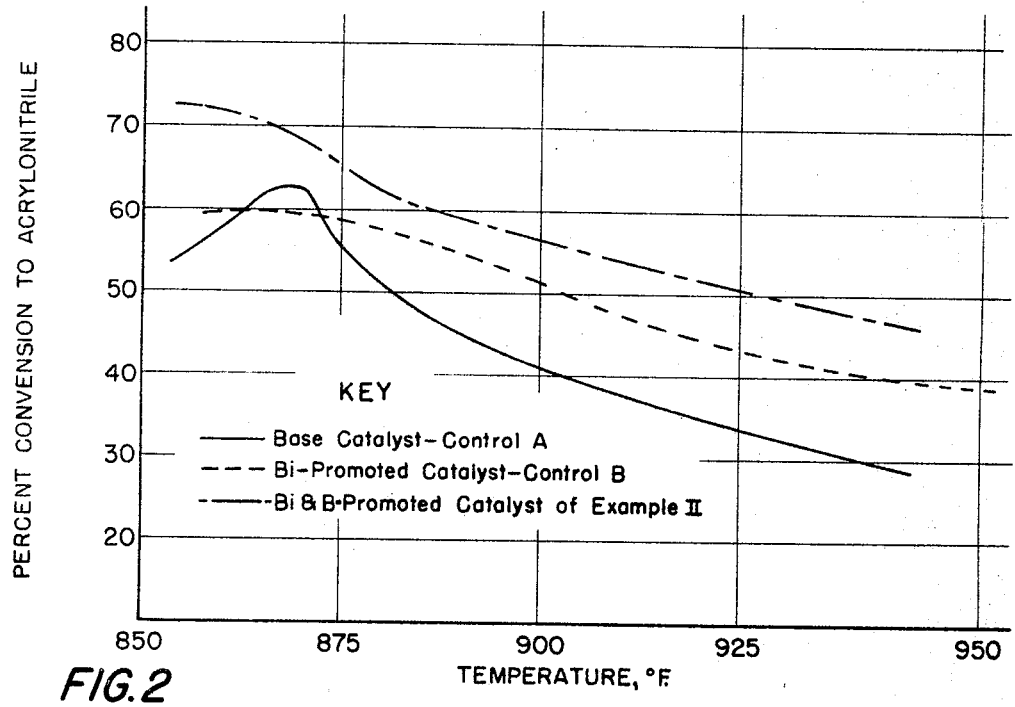

The catalysts were used in the conversion of propylene and ammonia to acrylonitrile, using the reactor and reaction conditions of Example I. The results obtained appear in FIGURE 2, graphing the percent conversion of propylene to acrylonitrile against temperature.

The catalyst of the invention at the optimum temperature of 850–860° F. gave a total conversion of 94.1% of which 72.9% was acrylonitrile, 12.7% acetonitrile, and the remainder carbon dioxide and hydrogen cyanide. The total useful yield was 94.9%. This is to be compared to the base catalyst, a 63.4% conversion to acrylonitrile, 13.0% conversion to acetonitrile, and the remainder carbon dioxide and hydrogen cyanide, giving a total conversion of 93.2% and a useful conversion of 78.6%. Again, Control B was poisoned by the 0.5% boron, and Control C was as in Example I.

Example III

Example I was repeated, using the same base catalyst, and the same bismuth nitrate and boric acid impregnating solutions and procedure. However, the amount of bismuth nitrate was reduced by ⅔, thereby reducing the total bismuth on the catalyst to 3%, and ammonium permanganate added to the bismuth nitrate solution in an

TABLE I

| $C_3=$/Air/NH$_3$/H$_2$O Mole Ratio | Temp., °F. | Percent Conversion, Carbon Basis | | | | | | | | |
|---|---|---|---|---|---|---|---|---|---|---|
| | | Acrylo-nitrile | Aceto-nitrile | HCN | CO | CO$_2$ | Useful | Total | Select | Yield |
| Control A: | | | | | | | | | | |
| 1/10/1/1 | 850 | 46.5 | 3.8 | 6.3 | 4.2 | 8.2 | 50.3 | 69.0 | 92.5 | 72.9 |
| 1/10/1/1 | 900 | 55.5 | 3.8 | 4.8 | 3.4 | 9.3 | 59.3 | 76.8 | 93.6 | 77.2 |
| 1/10/1/1 | 900 | 48.0 | 2.5 | 4.8 | 4.3 | 9.3 | 50.5 | 68.9 | 95.0 | 73.4 |
| 1/10/1/1 | 850 | 47.5 | 4.5 | 5.2 | 4.1 | 7.0 | 52.0 | 68.3 | 91.4 | 76.3 |
| 1/10/1/1 | 900 | 57.8 | 4.4 | 4.4 | 4.8 | 13.2 | 62.2 | 84.6 | 93.0 | 73.5 |
| 1/10/1/1 | 900 | 59.2 | 4.0 | 4.8 | 4.4 | 12.4 | 63.2 | 84.8 | 93.5 | 74.6 |
| 1/10/1/1 | 925 | 60.8 | 3.5 | 4.1 | 4.5 | 14.5 | 64.3 | 87.4 | 94.5 | 73.7 |
| 1/10/1/1 | 875 | 54.5 | 4.7 | 5.2 | 4.6 | 11.1 | 59.2 | 80.1 | 92.1 | 73.9 |
| Promoted Catalyst: | | | | | | | | | | |
| 1/10/1/1 | 850 | 51.4 | 5.4 | 3.5 | 2.4 | 9.9 | 56.8 | 72.6 | 90.4 | 78.2 |
| 1/10/1/1 | 900 | 60.9 | 3.8 | 3.1 | 2.7 | 13.9 | 64.7 | 84.4 | 94.0 | 76.7 |
| 1/10/1/1 | 900 | 62.1 | 3.5 | 3.5 | 2.9 | 13.1 | 65.6 | 85.1 | 94.6 | 77.0 |
| 1/10/1/1 | 850 | 59.6 | 5.4 | 4.5 | 3.2 | 10.6 | 65.0 | 83.3 | 91.7 | 76.7 |
| 1/10/1/1 | 850 | 58.0 | 4.7 | 3.4 | 1.5 | 7.8 | 62.7 | 75.4 | 92.5 | 83.3 |
| 1/10/1/1 | 850 | 54.0 | 4.3 | 4.7 | 3.4 | 10.0 | 58.3 | 76.4 | 92.6 | 76.4 |
| 1/10/1/1 | 875 | 64.0 | 5.0 | 4.0 | 3.6 | 13.2 | 69.1 | 89.9 | 92.8 | 77.0 |
| 1/10/1/1 | 875 | 59.5 | 4.6 | 4.2 | 3.6 | 12.5 | 64.1 | 84.4 | 92.8 | 76.0 |

It is apparent from the data that the promoted catalyst is quite superior to the base catalyst, although the difference is not as marked as when a fixed bed is used.

The bismuth and boron promoted catalyst was next employed in fixed-bed form for the conversion of propylene to acrolein. During the reaction the reactor was maintained at a temperature of 825° F. at atmospheric pressure. The contact time with the catalyst was approximately one second. The feed molar ratios were air/H$_2$O/propylene/nitrogen 5/6/1/32. Approximately 58% of the propylene feed was converted to acrolein and about 29% of the propylene was unreacted. This unreacted material could be recycled. The remainder of the product consisted of carbon oxides, minor amounts of low molecular weight carbonylic compounds, and organic acids.

amount to furnish 1% manganese on the catalyst, calculated as manganese from Mn$_2$O$_3$.

Figure 3:
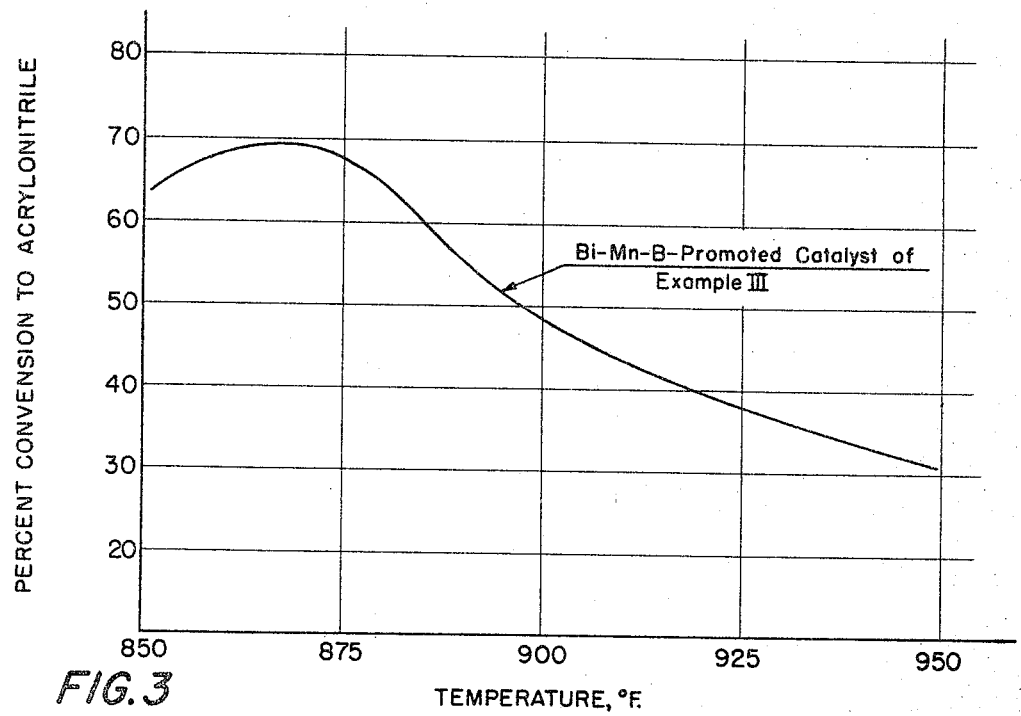

This catalyst was used to convert propylene and ammonia to acrylonitrile, using the apparatus and reaction conditions of Example I, in comparison with the base catalyst as a control. The results are graphed in FIGURE 3 as the percent conversion to acrylonitrile versus temperature.

The data show that at the optimum temperature of 850–870° F., the total conversion using the catalyst of the invention is 91.2%, of which 68% is acrylonitrile, 9.1% acetonitrile, and the remainder carbon dioxide and hydrogen cyanide. The total useful yield is 85.3%. In this case, the improvement over the base catalyst is not so great as when bismuth alone is used, but since manganese is much less costly than bismuth, the reduction can be more than outweighed by the economics in commercial use.

*Example IV*

A group of catalysts were prepared, promoted by the addition of 0.5% boron, in accordance wit hExample II, and using the base catalyst of Example I, with the amount of bismuth added varying from 0% to 10%, the procedure of Example I being used, with the content of bismuth nitrate in the solution being varied proportionately. The purpose was to elucidate the proportions of bismuth at which the enhanced catalytic effect is observed.

Figure 4:
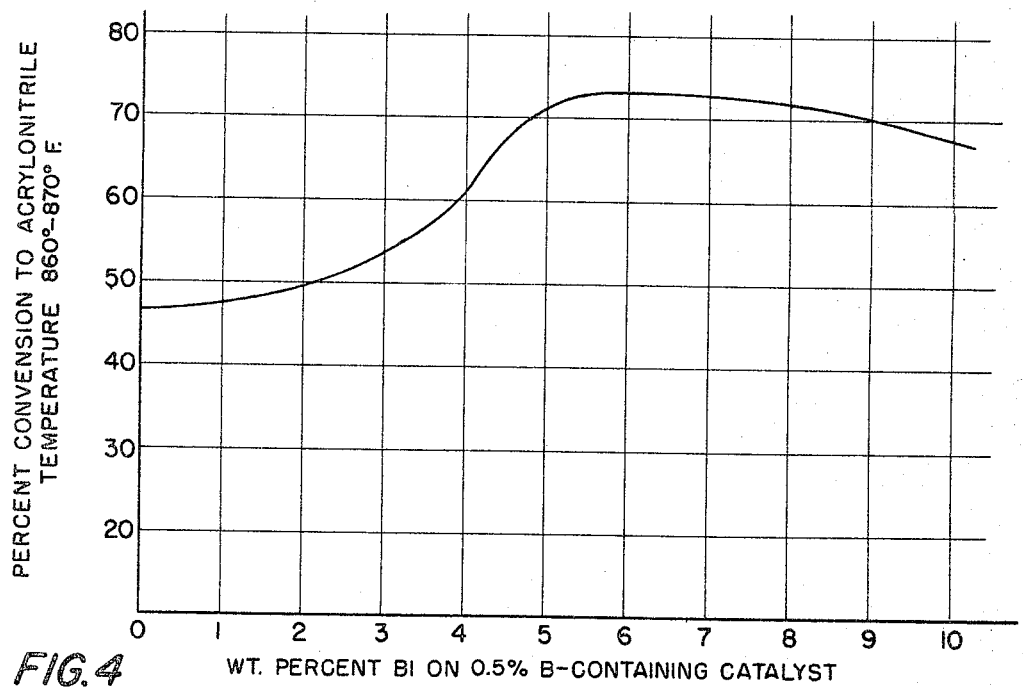

The catalysts were used to convert propylene and ammonia to acrylonitrile using the apparatus and reaction conditions of Example I, and a reaction temperature of 860–870° F., the optimum range. The results obtained are given in FIGURE 4, graphing the percent conversion to acrylonitrile against the percent bismuth on the base catalyst, the percent boron being constant at 0.5%.

The data show that the best enhanced catalytic effect is observed at from about 5 to about 10% bismuth oxide, calculated as bismuth.

*Example V*

Example I was repeated, to prepare a group of catalysts promoted by 5% bismuth oxide, calculated as bismuth, with the amount of boron being varied from 0% to 5% by varying proportionately the amount of boric acid in the treating solution. The base catalyst of Example I was employed for the impregnation. The purpose was to elucidate the proportions of boron at which the catalytic effect is observed at this amount of bismuth.

The catalysts were used to convert propylene and ammonia to acrylonitrile, using the apparatus of Example I, and a reaction temperature of 860–870° F., the optimum range. The results obtained are graphed in FIGURE 5 as percent acrylonitrile against percent boron oxide, calculated as boron.

The data show that the enhanced catalytic effect is observed at amounts of boron up to about 5%.

*Example VI*

A bismuth silicomolybdate catalyst was prepared following the procedure given in Example I, except that no phosphoric acid was added to the base catalyst slurry. This catalyst was then impregnated with bismuth nitrate and boric acid solution, as described in Example I, and the resulting catalyst used in the oxidation of propylene as in Example I, in comparison with the base catalyst. The promoted catalyst gave an increase of approximately 10% in the conversion of propylene to acrylonitrile, as compared to the base catalyst.

Each of the above examples utilizes the boron and bismuth-promoted catalyst of the invention in comparison against the base catalyst in the oxidation of olefins to oxygenated hydrocarbons, e.g., propylene to acrylonitrile. It will be understood that the promotional effect is also evidenced in the oxidative dehydrogenation of olefins to diolefins, such as butene to butadiene, and amylenes to isoprene, as described in U.S. Patent No. 2,991,320 to Hearne and Furman, patented July 4, 1961.

All percentages in the specification and claims are by weight, in the case of the catalyst composition, and by volume in the case of gases.

We claim:

1. The process for the manufacture of acrylonitrile and methacrylonitrile from propylene and isobutylene, respectively, which comprises the step of contacting in the vapor phase at a temperature within the range from about 550 to about 1000° F. at which acrylonitrile and methacrylonitrile formation proceeds a mixture of ammonia, an olefin selected from the group consisting of propylene and isobutylene and oxygen in a molar ratio of olefin to ammonia of about 1:1 and a molar ratio of olefin to oxygen of from 1:1 to 1:2, with a catalyst composition consisting essentially of oxides of bismuth and molybdenum as the essential catalytic ingredients, the bismuth oxide being present in an amount to furnish a bismuth to molybdenum Bi:Mo atomic ratio of above 1:3, promoted by a mixture of oxides of boron and bismuth in the proportion of about 0.5 to about 1%, calculated as boron, and about 5 to about 10%, calculated as bismuth.

2. A process in accordance with claim 1, in which the olefin is propylene.

3. A process in accordance with claim 1, in which the catalyst composition also includes phosphorus in an amount up to about 5% by weight.

4. A process in accordance with claim 1, in which the catalyst composition includes manganese oxide as a promoter in an amount up to about one-third the weight of the bismuth oxide promoter.

5. A process in accordance with claim 1, in which the catalyst composition also includes silica, the silica being present in an amount from about 25 to about 75% by weight of the catalyst.

6. A process in accordance with claim 5, in which the catalyst composition also includes phosphorus in an amount up to about 5% by weight.

References Cited

UNITED STATES PATENTS

| | | | |
|---|---|---|---|
| 2,904,580 | 9/1959 | Idol | 260—465.3 |
| 3,248,340 | 4/1966 | Callahan et al. | 252—432 |

JOSEPH P. BRUST, *Primary Examiner.*